(12) United States Patent
Vancorenland et al.

(10) Patent No.: US 8,374,296 B2
(45) Date of Patent: Feb. 12, 2013

(54) OUTPUT CIRCUITRY FOR MINIMIZING SPURIOUS FREQUENCY CONTENT

(75) Inventors: Peter J. Vancorenland, Austin, TX (US); Scott Willingham, Austin, TX (US); Mustafa Koroglu, Austin, TX (US); Jing Li, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1323 days.

(21) Appl. No.: 12/057,988

(22) Filed: Mar. 28, 2008

(65) Prior Publication Data

US 2009/0245440 A1 Oct. 1, 2009

(51) Int. Cl.
H03D 1/04 (2006.01)
H03D 1/06 (2006.01)
H03K 5/01 (2006.01)
H03K 6/04 (2006.01)
H04B 1/10 (2006.01)
H04L 1/00 (2006.01)
H04L 25/08 (2006.01)

(52) U.S. Cl. ............... 375/346; 375/285; 375/316
(58) Field of Classification Search ............... 375/346
See application file for complete search history.

(56) References Cited

U.S. PATENT DOCUMENTS

| | | | | |
|---|---|---|---|---|
| 5,212,444 A * | 5/1993 | Abramovich et al. | ... | 324/207.13 |
| 6,320,458 B1 * | 11/2001 | Cusinato et al. | ............. | 327/543 |
| 6,900,697 B1 * | 5/2005 | Doyle et al. | .................. | 330/297 |
| 7,042,259 B2 * | 5/2006 | Kurd et al. | ..................... | 327/147 |
| 7,340,230 B2 | 3/2008 | Khoini-Poorfard et al. | | |
| 7,759,915 B2 * | 7/2010 | Ganti et al. | .................... | 323/268 |
| 7,890,071 B2 * | 2/2011 | May et al. | ................... | 455/186.1 |
| 8,009,077 B1 * | 8/2011 | Melanson | ...................... | 341/155 |
| 2004/0090273 A1 * | 5/2004 | Chang et al. | .................... | 331/16 |
| 2004/0150438 A1 * | 8/2004 | Jung et al. | ..................... | 327/119 |
| 2005/0117663 A1 * | 6/2005 | Drogi et al. | ..................... | 375/316 |
| 2006/0126864 A1 * | 6/2006 | Ryoo et al. | .................... | 381/94.5 |
| 2007/0063885 A1 * | 3/2007 | Hong | ............................ | 341/172 |
| 2008/0012628 A1 * | 1/2008 | Bushman et al. | ............. | 327/538 |
| 2008/0111720 A1 * | 5/2008 | Huang et al. | ..................... | 341/53 |
| 2009/0153242 A1 * | 6/2009 | Cygan et al. | .................... | 330/10 |
| 2009/0265572 A1 * | 10/2009 | Heinle et al. | .................. | 713/500 |
| 2010/0166114 A1 * | 7/2010 | Dawkins | ....................... | 375/319 |
| 2010/0211700 A1 * | 8/2010 | de Cesare et al. | ................ | 710/14 |
| 2010/0244937 A1 * | 9/2010 | Anidjar et al. | ................ | 327/538 |

* cited by examiner

*Primary Examiner* — Erin File
(74) *Attorney, Agent, or Firm* — O'Keefe, Egan Peterman & Enders LLP

(57) ABSTRACT

A system including first voltage supply circuitry configured to provide a first voltage supply with spurious frequency content and second voltage supply circuitry configured to provide a second voltage supply without the spurious frequency content is provided. The system includes signal generation circuitry configured to generate a first digital signal using a clock signal and the first voltage supply and configured to cause the spurious frequency content on the first voltage supply and output circuitry configured to generate a second digital signal from the first digital signal synchronous with the clock signal using the second voltage supply.

28 Claims, 6 Drawing Sheets

US 8,374,296 B2

OUTPUT CIRCUITRY FOR MINIMIZING SPURIOUS FREQUENCY CONTENT

BACKGROUND

Radio frequency (RF) receivers are used in a wide variety of applications such as cellular or mobile telephones, cordless telephones, personal digital assistants (PDAs), computers, radios and other devices that transmit or receive RF signals. In processing an RF signal, digital processing circuitry in an RF receiver may induce spurious frequency content onto the RF signal.

FIG. 1 is a diagram illustrating one embodiment of spurious frequency content in a digital signal 24 such as an RF signal. Circuitry 10 (e.g., an inverter as shown) receives a digital input signal 16 at an input terminal 12 and outputs an output signal 24 at an output terminal 14. As shown in a graph 18, input signal 16 has desired frequency content at an input frequency $f_1$ and at harmonics of the input frequency (e.g., $2f_1$, $3f_1$, $4f_1$, etc.). A voltage supply 20 ($V_{DD}$) that provides power to circuitry 10, however, has undesired frequency content at a frequency $f_2$ and at harmonics of the frequency (e.g., $2f_2$, $3f_2$, $4f_2$, etc.). The undesired frequency content on voltage supply 20 causes spurious frequency content on output signal 24 at frequencies $f_1+f_2$, $f_1-f_2$, $f_1+2f_2$, $f_1-2f_2$, ..., $2f_1+f_2$; $2f_1-f_2$, $2f_1+2f_2$, $2f_1-2f_2$, ..., etc. The spurious frequency content is shown by the dotted arrows in a graph 26 around the solid arrows that indicate the frequency content at the input frequency $f_1$ and the harmonics of the input frequency. The spurious frequency content in digital signal 24 occurs as a result of AM-to-PM conversion of voltage supply 20 in circuitry 10 and causes phase jitter in output signal 24 so that signal transitions in output signal 24, such as signal transitions 24A and 24B, may be undesirably shifted in time.

SUMMARY

According to one exemplary embodiment, a system including first voltage supply circuitry configured to provide a first voltage supply with spurious frequency content and second voltage supply circuitry configured to provide a second voltage-supply without the spurious frequency content is provided. The system includes signal generation circuitry configured to generate a first digital signal using a clock signal and the first voltage supply and configured to cause the spurious frequency content on the first voltage supply and output circuitry configured to generate a second digital signal from the first digital signal synchronous with the clock signal using the second voltage supply.

In another exemplary embodiment, a method including generating a first digital signal using a first clock signal and a first voltage supply that has spurious frequency content and generating a second digital signal from the first digital signal using a second clock signal that is synchronized with the first clock signal and a second voltage supply that is sufficiently electrically isolated from the first voltage supply so that the second voltage supply includes no more than a minimal amount of the spurious frequency content is provided.

In further exemplary embodiment, a system including means for generating a first digital signal using a first clock signal and a first voltage supply that has spurious frequency content and means for generating a second digital signal from the first digital signal using a second clock signal that is synchronized with the first clock signal and a second voltage supply that is sufficiently electrically isolated from the first voltage supply so that the second voltage supply includes no more than a minimal amount of the spurious frequency content is provided.

In yet another exemplary embodiment, a receiver configured to generate a first digital audio signal from an radio frequency (RF) signal received at a broadcast channel using a first voltage supply that has spurious frequency content, the receiver configured to generate a second digital audio signal from the first signal using a second voltage supply that does not have the spurious frequency content and a host coupled to the receiver is provided. The receiver is configured to provide the second digital audio signal to the host.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

As described herein, output circuitry is provided to minimize spurious frequency content in a digital signal. The output circuitry receives the digital signal from signal processing circuitry that is driven by a clock signal and a voltage supply that has spurious frequency content. The spurious frequency content on the voltage supply may be induced by the signal processing circuitry or other circuitry connected to the voltage supply or may be caused by voltage supply circuitry that generates the voltage supply. The output circuitry generates an output signal from the digital signal synchronous with the clock signal using another voltage supply (i.e., a clean voltage supply) that does not have spurious frequency content.

Figure 2A:
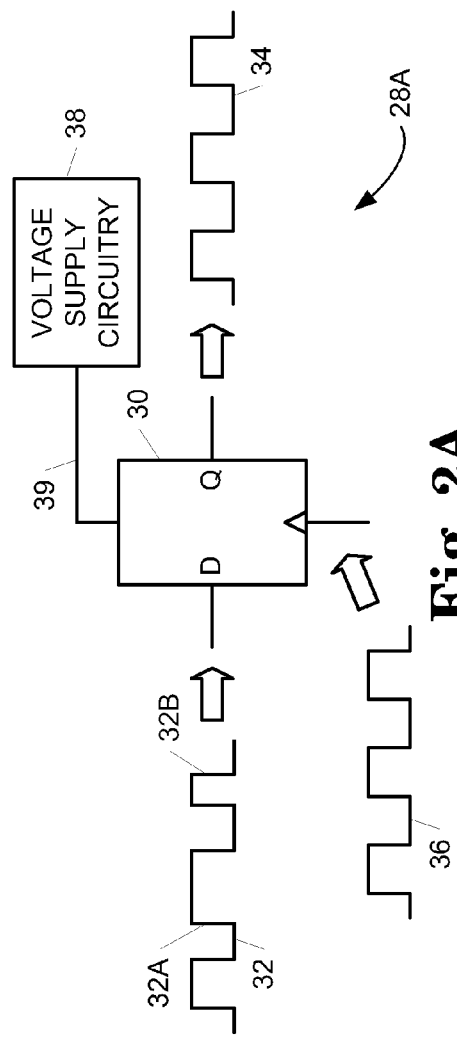
FIG. 2A-2B are block diagrams illustrating embodiments of output circuitry for minimizing spurious frequency content in a digital output signal.
Figure 2B:
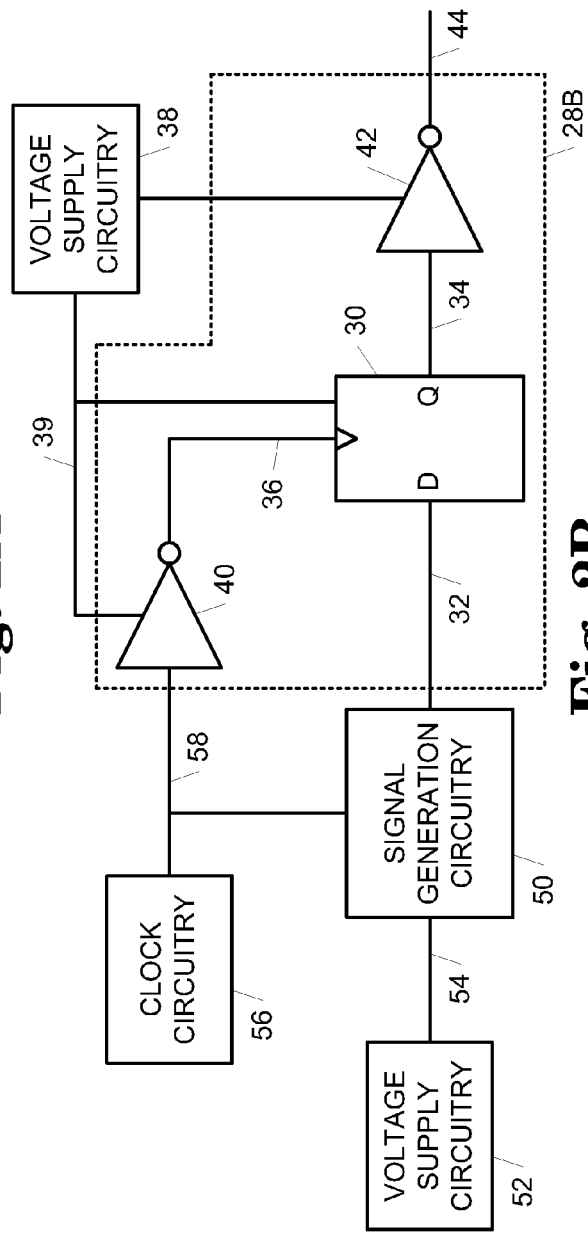

FIG. 2A-2B are block diagrams illustrating embodiments of output circuitry 28 for minimizing spurious frequency content in a digital signal 34 that is generated from a digital signal 32 with spurious frequency content. Output circuitry 28 reproduces digital signal 32 as digital signal 34 but with none or no more than a minimal amount of the spurious frequency content of digital signal 32.

In the embodiment of FIG. 2A, an embodiment 28A of output circuitry 28 includes a DQ flip-flop 30 configured to receive a digital signal 32 on the D input and a clock signal 36 on the clock input and provide a digital signal 34 on the Q output. Voltage supply circuitry 38 generates a clean voltage supply 39 and provides clean voltage supply 39 to DQ flip-flop 30 to power DQ flip-flop 30. Clean voltage supply 39 includes none or no more than a minimal amount of the spurious frequency content of digital signal 32 and does not include other frequency content that would create more than a minimal amount of spurious frequency content on digital signal 34.

DQ flip-flop 30 operates in response to clock signal 36 to output the logic level of digital signal 32 (i.e., a low or a high voltage that represent logic values of zero and one, respectively, or one and zero, respectively) as digital signal 34 on alternate transitions of clock signal 36. In one embodiment, DQ flip-flop 30 operates as a positive or rising edge DQ flip-flop to output the logic level of digital signal 32 as digital signal 34 on the positive or rising transitions of clock signal 36. In another embodiment, DQ flip-flop 30 operates as a negative or falling edge DQ flip-flop to output the logic level of digital signal 32 as digital signal 34 on the negative or falling transitions of clock signal 36. DQ flip-flop 30 may also include a Q' output (not shown) that may be used to provide digital signal 34 in other embodiments.

Input signal 32 has desired frequency content at an input frequency $f_1$. Input signal 32 also has undesired, spurious frequency content at least one frequency $f_2$ or range of frequencies that include frequency $f_2$ and at harmonics of the frequency (e.g., $2f_2$, $3f_2$, $4f_2$, etc.) or range of frequencies. In one embodiment, the spurious frequency content appears on a voltage supply that is used to by circuitry that generates digital signal 32. The spurious frequency content may be induced in the voltage supply by the circuitry that generates digital signal 32 or other loads or circuitry connected to the voltage supply or may be caused by voltage supply circuitry that generates the voltage supply. Because of the spurious frequency content, one or more signal transitions, such as transitions 32A and 32B, may be undesirably shifted forward or backward in time as shown in the example of FIG. 2A.

DQ flip-flop 30 operates to minimize any spurious frequency content in digital signal 34 by using a clean clock signal 36 and clean voltage supply 39. DQ flip-flop 30, the source of clock signal 36, and voltage supply circuitry 38 are sufficiently electrically isolated from the source of the spurious frequency content that is present on digital signal 32 so that digital signal 34 includes none or no more than a minimal amount of the spurious frequency content. In particular, DQ flip-flop 30 and the clock source are powered by clean voltage supply 39 which does not have the spurious frequency content. Thus, DQ flip-flop 30 and the clock circuitry may be powered by different voltage supply circuitry (i.e., voltage supply circuitry 38) than the circuitry that generates digital signal 32 in one embodiment.

Clock signal 36 may be synchronous with a clock signal that is used to generate digital signal 32. In embodiments where clock signal 36 and the clock signal that is used to generate digital signal 32 originate from a common source, additional circuitry may be included to prevent any spurious frequency content on the clock signal that is used to generate digital signal 32 from being included in clock signal 36. In embodiments where clock signal 36 and the clock signal that is used to generate digital signal 32 originate from a different sources, circuitry used to synchronize the clock signals may be configured to prevent any spurious frequency content on the clock signal that is used to generate digital signal 32 from being included in clock signal 36.

In other embodiments, DQ flip-flop 30 may be replaced with other suitable circuitry configured to reproduce digital signal 32 as digital signal 34 while minimizing the spurious frequency content present on digital signal 32.

FIG. 2B illustrates an embodiment 28B of output circuitry 28. Output circuitry 28 includes DQ flip-flop 30 and inverters 40 and 42.

Signal generation circuitry 108 is configured to generate digital signal 32 and provide digital signal 32 to DQ flip-flop 30. Voltage supply circuitry 52 generates a voltage supply 54 and provides voltage supply 54 to signal generation circuitry 108 to power signal generation circuitry 108. Clock circuitry 56 generates a clock signal 58 and provides clock signal 58 to signal generation circuitry 108.

Signal generation circuitry 50 is configured to generate digital signal 32 and provide digital signal 32 to DQ flip-flop 30. Voltage supply circuitry 52 generates a voltage supply 54 and provides voltage supply 54 to signal generation circuitry 50 to power signal generation circuitry 50. Clock circuitry 56 generates a clock signal 58 and provides clock signal 58 to signal generation circuitry 50.

Signal generation circuitry 50 generates and outputs digital signal 32 using voltage supply 54 and clock signal 58. As described above, signal generation circuitry 50 generates digital signal 32 with spurious frequency content. In one embodiment, signal generation circuitry 50 generates the spurious frequency content during normal operation and causes the spurious frequency content to be induced onto voltage supply 54. Voltage supply circuitry 52, thus, provides voltage supply 54 with the spurious frequency content. For example, in an embodiment where signal generation circuitry 50 generates digital signal 32 to include a digital audio signal with 32,000 frames of digital audio per second, signal generation circuitry 50 generates spurious frequency content with a frequency of approximately 32 kHz and causes the 32 kHz content to be induced on voltage supply 54. In other embodiments, voltage supply circuitry 52 or other circuitry coupled to or in close proximity to signal generation circuitry 50 and/or voltage supply circuitry 52 generates the spurious frequency content and causes the spurious frequency content to be included in digital signal 32.

Output circuitry 28B receives digital signal 32 with the spurious frequency content and generates a digital signal 44 from digital signal 32. Voltage supply circuitry 38 generates clean voltage supply 39 and provides voltage supply 39 to output circuitry 28B to power output circuitry 28B. Voltage supply circuitry 38 is sufficiently electrically isolated from voltage supply circuitry 52 so that so that voltage supply 39 includes none or no more than a minimal amount of the spurious frequency content of voltage supply 54. Clock circuitry 56 provides clock signal 58 to output circuitry 28B.

Output circuitry 28B generates and outputs digital signal 44 using voltage supply 39 and a clock signal 36 generated from clock signal 58. Inverter 40 receives clock signal 58, inverts clock signal 58 to generate clock signal 36, and provides clock signal 36 to DQ flip-flop 30. By generating clock signal 36 using the voltage supply 39 that has, at most, a minimal amount of the spurious frequency content, inverter 40 sufficiently electrically isolates output circuitry 28B from any spurious frequency content that may be on clock signal 58. Accordingly, inverter 40 prevents any spurious frequency content on clock signal 58 from being included in clock signal 36.

Voltage supply circuitry 38 also provides voltage supply 39 to DQ flip-flop 30 and inverter 42. Using voltage supply 39 and clock signal 36, DQ flip-flop 30 generates digital signal 34 with none or no more than a minimal amount of the spurious frequency content on digital signal 32. Inverter 42 inverts digital signal 34 to generate digital signal 44 using voltage supply 39.

Voltage supply circuitry 52 and voltage supply circuitry 38 may be provided power from a common power supply or may from different power supplies. In embodiments where a common power supply provides power to voltage supply circuitry 52 and voltage supply circuitry 38, voltage supply circuitry 52 and voltage supply circuitry 38 are configured to be sufficiently electrically isolated from one another so that voltage supply 39 includes none or no more than a minimal amount of spurious frequency content present on voltage supply 54.

An integrated low power, low intermediate frequency (low-IF) receiver that receives radio-frequency (RF) signals or signals from other frequency bands that includes one or more instances of output circuitry 28 will now be described. In one embodiment, the low-IF receiver includes RF circuitry configured to receive an RF signal, a digital signal processor configured to generate a digital audio signal from the RF signal, and output circuitry configured to generate a digital audio output signal from the digital audio signal while minimizing spurious frequency content in the digital audio output signal. In other embodiments, other types of receivers or other circuitry applications may include one or more instances of output circuitry 28.

The low-IF receivers described herein may be used in a wide variety of integrated communications systems. Although terrestrial RF receivers, e.g., FM and AM receivers, are described herein, these receivers are presented by way of example. In other embodiments, other frequency bands may be used.

Figure 3A:
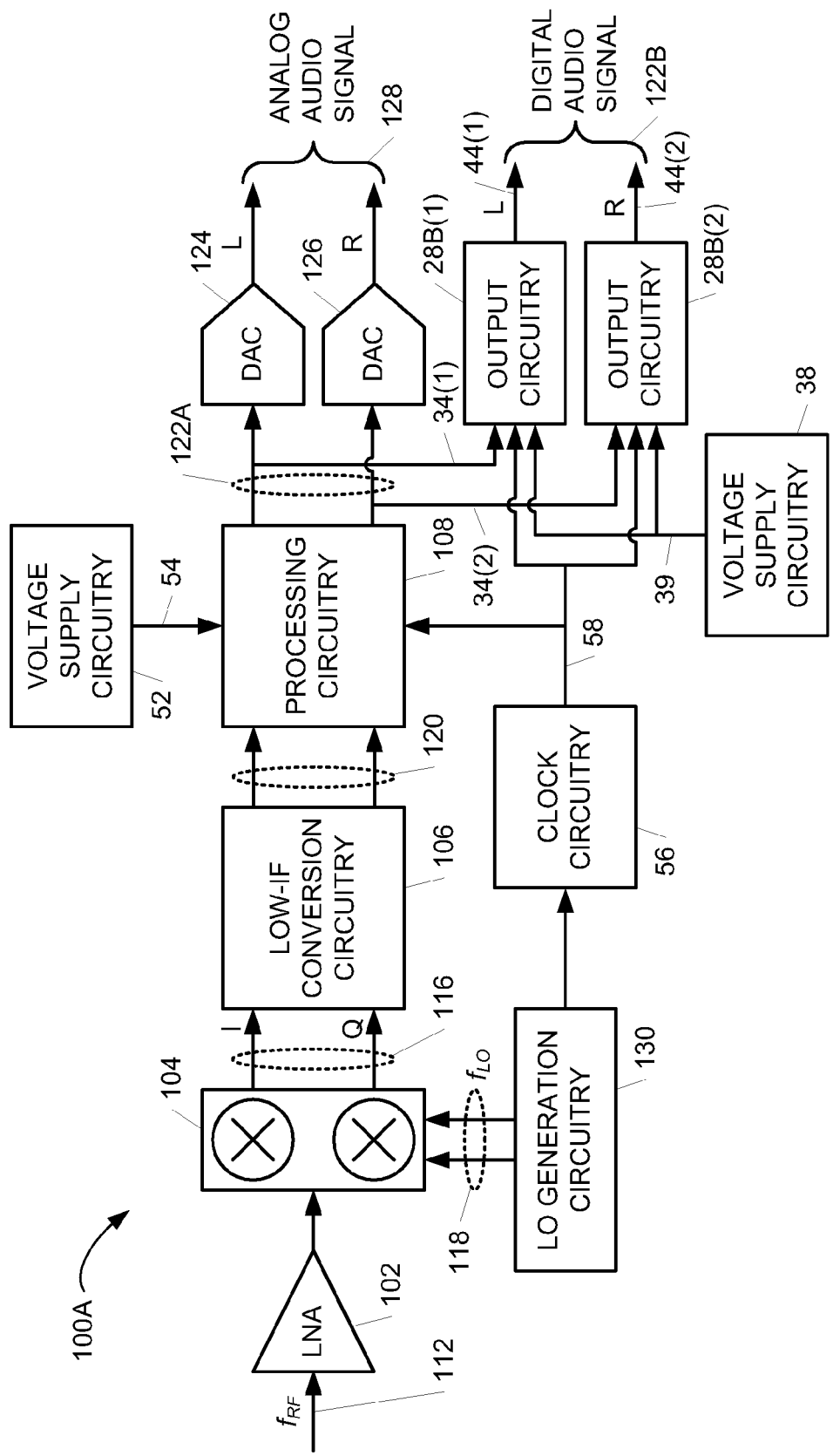
FIGS. 3A-3C are block diagrams illustrating embodiments of a low intermediate frequency (low-IF) receiver.
Figure 3B:
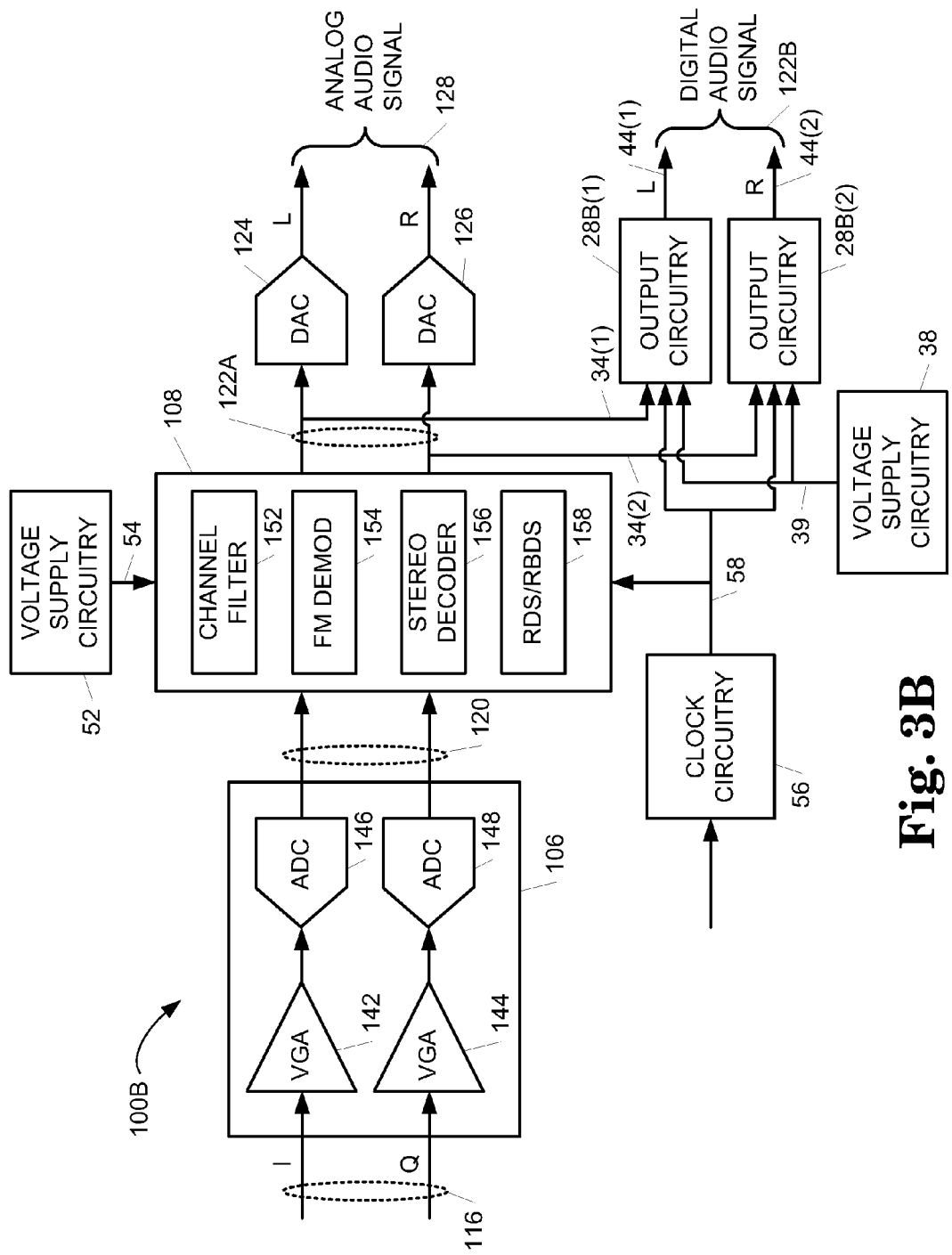
Figure 3C:
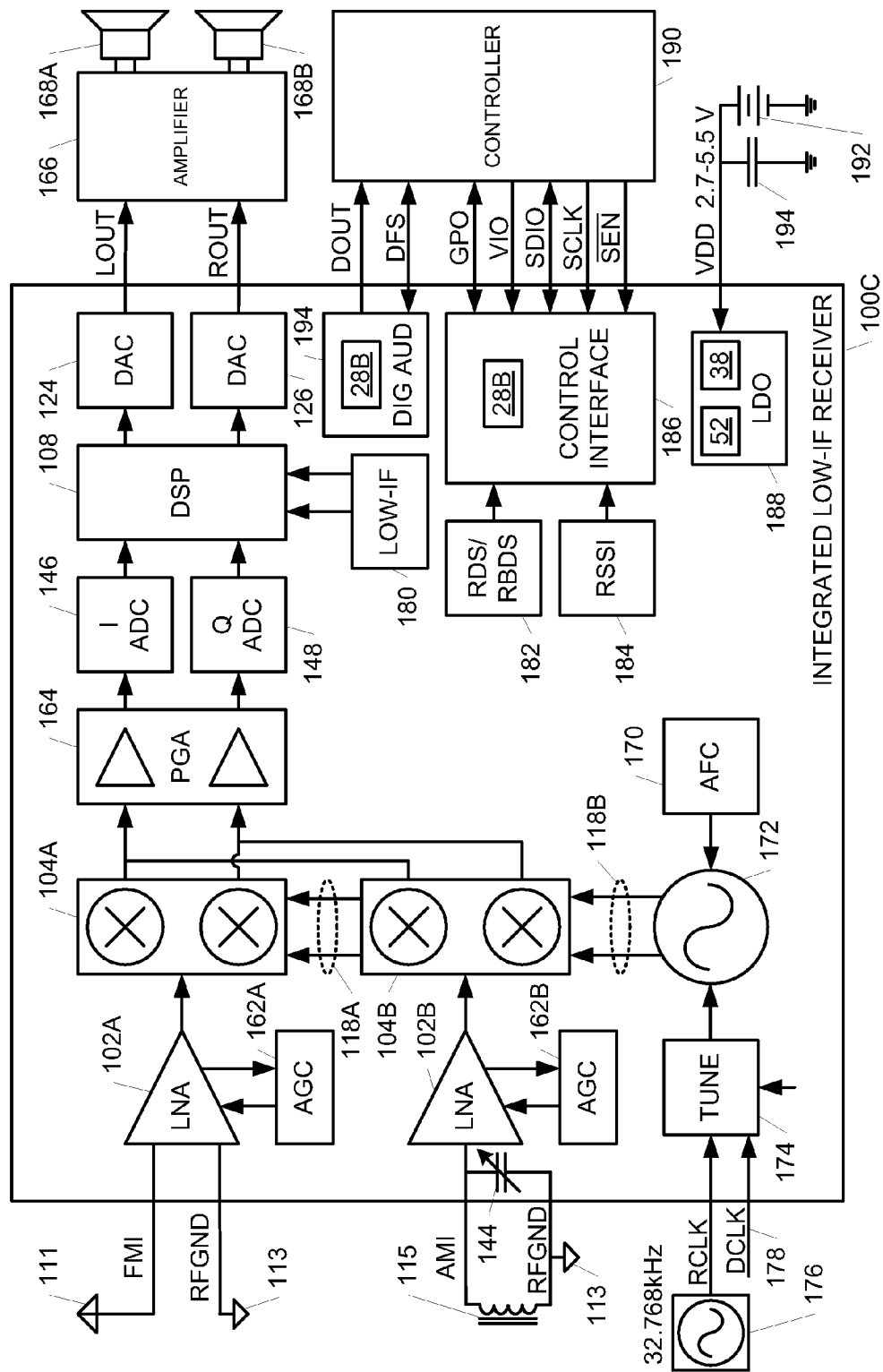

FIG. 3A is a block diagram illustrating an embodiment 100A of a low intermediate frequency (low-IF) receiver 100. Receiver 100A includes at least two instances 28B(1) and 28B(2) of output circuitry 28B, voltage supply circuitry 52, clock circuitry 56, voltage supply circuitry 38, a low noise amplifier (LNA) 102, a mixer 104, low intermediate frequency (IF) conversion circuitry 106, processing circuitry 108, digital-to-analog converters 124 and 126, and local oscillator generation circuitry 130.

Receiver 100A is configured to receive a radio-frequency (RF) signal spectrum 112 and process signal spectrum 112 to generate a digital audio signal 122 and an analog audio signal 128 using a low intermediate frequency (IF) architecture. In one embodiment, receiver 100A forms an integrated terrestrial broadcast receiver configured to receive radio-frequency (RF) signals. As used herein, an RF signal means an electrical signal conveying useful information and having a frequency from about 3 kilohertz (kHz) to thousands of gigahertz (GHz), regardless of the medium through which the signal is conveyed. Thus, an RF signal may be transmitted through air, free space, coaxial cable, and/or fiber optic cable, for example. Accordingly, receiver 101A may receive signal spectrum 112 from a wired or wireless medium. In other embodiments, receiver 100A may be configured to receive signals 112 in another suitable frequency range.

In one embodiment, receiver 100A is configured as an AM/FM terrestrial broadcast receiver. In this embodiment, signal spectrum 112 includes the AM/FM terrestrial broadcast spectrum with a plurality of different AM and FM broadcast channels that are centered at different broadcast frequencies. In other embodiments, receiver 100A may be configured as a terrestrial broadcast receiver where signal spectrum 112 includes other terrestrial broadcast spectra with other channels.

LNA 102 receives RF signal spectrum 112 and generates an amplified output signal. The output of LNA 102 is then applied to mixer 104, and mixer 104 generates real (I) and imaginary (Q) output signals, as represented by signals 116. To generate low-IF signals 116, mixer 104 uses phase shifted local oscillator (LO) mixing signals 118. LO generation circuitry 130 includes oscillation circuitry (not shown) and outputs two out-of-phase LO mixing signals 118 that are used by mixer 104. The outputs of mixer 104 are at a low-IF which may be fixed or designed to vary, for example, if discrete step tuning for LO generation circuitry 130. An example of large step LO generation circuitry that utilizes discrete tuning steps is described in the co-owned and co-pending U.S. patent application Ser. No. 10/412,963, which was filed Apr. 14, 2003, which is entitled "RECEIVER ARCHITECTURES UTILIZING COARSE ANALOG TUNING AND ASSOCIATED METHODS," and which is hereby incorporated by reference in its entirety.

Low-IF conversion circuitry 106 receives the real (I) and imaginary (Q) signals 116 and outputs real and imaginary digital signals, as represented by signals 120. Low-IF conversion circuitry 106 preferably includes band-pass or low-pass analog-to-digital converter (ADC) circuitry that converts the low-IF input signals to the digital domain. Low-IF conversion circuitry 106 provides, in part, analog-to-digital conversion, signal gain, and signal filtering functions. Low-IF conversion circuitry 106 provides signals 120 to processing circuitry 108.

Processing circuitry 108 performs digital filtering and digital signal processing to further tune and extract the signal information from digital signals 120. Processing circuitry 108 produces baseband digital audio signals 122A. When the input signals relate to FM broadcasts, the digital processing provided by processing circuitry 108 may include, for example, FM demodulation and stereo decoding. Digital signals 122A may include left (L) and right (R) digital audio output channels that represent the content of the FM broadcast channel being tuned. Processing circuitry 108 also provides the left and right digital audio channels of signals 122A to DACs 124 and 126, respectively. DACs 124 and 126 receive the left and right digital audio channels of signals 122A, respectively, and convert digital signals 122A to analog audio output signals 128 with left and right analog audio output channels. Processing circuitry 108 is further configured to generate and output RDS (Radio Data System) and/or RBDS (Radio Broadcast Data System) signals from digital signals 120.

Processing circuitry 108 forms one embodiment of signal generation circuitry 50 and provides the left and right digital audio channels of signals 122A as inputs 34(1) and 34(2), respectively, to output circuitry 28B(1) and output circuitry 28B(2), respectively. In one embodiment, processing circuitry 108 generates signals 122A at a rate of 32,000 frames of digital audio per second and thereby causes spurious frequency content with a frequency of approximately 32 kHz to be induced on voltage supply 54 provided by voltage supply circuitry 52.

LO generation circuitry 130 also provides a reference signal to clock circuitry 56. Clock circuitry 56 generates clock signal 58 from the reference signal and provides clock signal 58 to output circuitry 28B(1) and output circuitry 28B(2).

Output circuitry 28B(1) and output circuitry 28B(2) each operate as described above with reference to FIG. 2B to generate digital signals 44(1) and 44(2), respectively, from the left and right digital audio channels of signals 122A, respectively, using clock signal 58 and voltage supply 39 provided by voltage supply circuitry 38. Output circuitry 28B(1) and output circuitry 28B(2) generate digital signals 44(1) and 44(2), respectively, so that digital signals 44(1) and 44(2) include none or no more than a minimal amount of the spurious frequency content of the left and right digital audio channels of signals 122A, respectively. Digital signals 44(1) and 44(2) form the left and right digital audio output channels of signals 122B.

In other embodiments, receiver 100A includes other instances of output circuitry 28B for use in generating and provided other digital output signals.

In other embodiments, the output of receiver 100A may be other desired signals, including, for example, low-IF quadrature I/Q signals from an analog-to-digital converter that are passed through a decimation filter, a baseband signal that has not yet be demodulated, multiplexed L+R and L−R audio signals, and/or any other desired output signals.

As used herein, low-IF conversion circuitry refers to circuitry that in part mixes the target channel within the input signal spectrum down to an IF that is equal to or below about three channel widths. For example, for FM broadcasts within the United States, the channel widths are about 200 kHz. Thus, broadcast channels in the same broadcast area are specified to be at least about 200 kHz apart. For the purposes of this description, therefore, a low IF frequency for FM broadcasts within the United States would be an IF frequency equal to or below about 600 kHz. It is further noted that for spectrums with non-uniform channel spacings, a low IF frequency would be equal to or below about three steps in the channel tuning resolution of the receiver circuitry. For example, if the receiver circuitry were configured to tune channels that are at least about 100 kHz apart, a low IF frequency would be equal to or below about 300 kHz. As noted above, the IF frequency may be fixed at a particular frequency or may vary within a low-IF ranges of frequencies, depending upon the LO generation circuitry utilized and how it is controlled.

For purposes of illustration, input signals 112 of receiver 100A described herein may be received in signal bands such as AM audio broadcast bands, FM audio broadcast bands, television audio broadcast bands, weather channel bands, or other desired broadcast bands. The following table provides example frequencies and uses for various broadcast bands that may be received by receiver 100A.

TABLE 1

EXAMPLE FREQUENCY BANDS AND USES

| FREQUENCY | USES/SERVICES |
| --- | --- |
| 150-535 kHz | European LW radio broadcast |
| | 9 kHz spacing |
| 535-1700 kHz | MW/AM radio broadcast |
| | U.S. uses 10 kHz spacing |
| | Europe uses 9 kHz spacing |
| 1.7-30 MHz | SW/HF international radio broadcasting |
| 46-49 MHz | Cordless phones, baby monitors, remote control |
| 59.75 (2) MHz | U.S. television channels 2-6 (VHF_L) |
| 65.75 (3) MHz | 6 MHz channels at 54, 60, 66, 76, 82 |
| 71.75 (4) MHz | Audio carrier is at 5.75 MHz (FM MTS) |
| 81.75 (5) MHz | |
| 87.75 (6) MHz | |
| 47-54 (E2) MHz | European television |
| 54-61 (E3) MHz | 7 MHz channels, FM sound |
| 61-68 (E4) MHz | Band I: E2-E4 |
| 174-181 (E5) MHz | Band II: E5-E12 |
| 181-188 (E6) MHz | |
| 188-195 (E7) MHz | |
| 195-202 (E8) MHz | |
| 202-209 (E9) MHz | |
| 209-216 (E10) MHz | |
| 216-223 (E11) Mhz | |
| 223-230 (E12) MHz | |

TABLE 1-continued

EXAMPLE FREQUENCY BANDS AND USES

| FREQUENCY | USES/SERVICES |
| --- | --- |
| 76-91 MHz | Japan FM broadcast band |
| 87.9-108 MHz | U.S./Europe FM broadcast band |
| | 200 kHz spacing (U.S.) |
| | 100 kHz spacing (Europe) |
| 162.550 (WX1) MHz | U.S. Weather Band |
| 162.400 (WX2) MHz | 7 channels, 25 kHz spacing |
| 162.475 (WX3) MHz | SAME: Specific Area Message Encoding |
| 162.425 (WX4) MHz | |
| 162.450 (WX5) MHz | |
| 162.500 (WX6) MHz | |
| 162.525 (WX7) MHz | |
| 179.75 (7) MHz | U.S. television channels 7-13 (VHF_High) |
| | 6 MHz channels at 174, 180, 186, 192, 198, 204, 210 |
| 215.75 (13) MHz | FM Sound at 5.75 MHz |
| 182.5 (F5) Mhz | French television F5-F10 Band III |
| | 8 MHz channels |
| 224.5 (F10) MHz | Vision at 176, 184, 192, 200, 208, 216 MHz |
| | AM sound at +6.5 MHz |
| 470-478 (21) MHz | Band IV-television broadcasting |
| | Band V-television broadcasting |
| 854-862 (69) MHz | 6 MHz channels from 470 to 862 MHz |
| | U.K. System I (PAL): |
| | Offsets of +/−25 kHz may be used to alleviate co-channel interference |
| | AM Vision carrier at +1.25 (Lower Sideband vestigial) |
| | FMW Sound carrier at +7.25 |
| | Nicam digital sound at +7.802 |
| | French System L (Secam): |
| | Offsets of +/−37.5 kHz may be used |
| | AM Vision carrier at +1.25 (inverted video) |
| | FMW Sound carrier at +7.75 |
| | Nicam digital sound at +7.55 |
| 470-476 (14) MHz | U.S. television channels 14-69 |
| | 6 MHz channels |
| 819-825 (69) MHz | Sound carrier is at 5.75 MHz (FM MTS) |
| | 14-20 shared with law enforcement |

Figure 1:
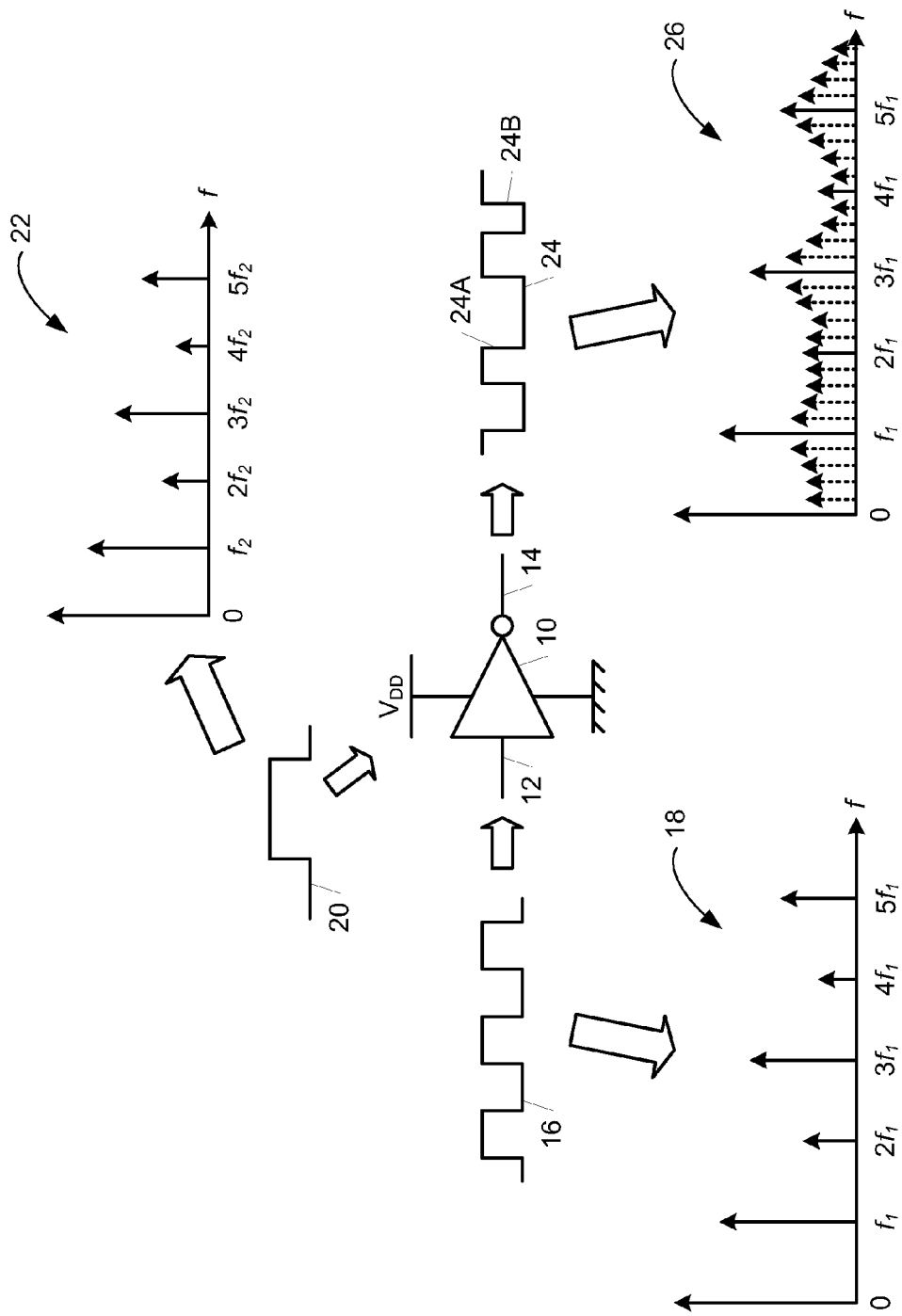
FIG. 1 is a diagram illustrating one embodiment of spurious frequency content in a digital signal.

FIG. 1B is a block diagram illustrating an embodiment 100B of receiver 100. In receiver 100B, low-IF conversion circuitry 106 includes variable gain amplifiers (VGAs) 142 and 144 and analog-to-digital converters 146 and 148. Processing circuitry 108 includes an RDS/RBDS decoder 158.

VGAs 142 and 144 receive the real (I) and imaginary (Q) signals 116, respectively, that have been mixed down to a low-IF frequency by mixer 104 and amplify signals 116. Band-pass ADC 146 converts the output of VGA 142 from low-IF to the digital domain to produce the real (I) portion of digital output signals 120, and band-pass ADC 148 converts the output of VGA 144 from low-IF to the digital domain to produce the imaginary (Q) portion of digital output signals 120. In other embodiments, ADCs 146 and 148 may be implemented as complex band-pass ADCs, real low-pass ADCs, or any other desired ADC architecture.

Processing circuitry 108 receives signals 120 from ADCs 146 and 148 and digitally processes signals 120 to further tune the target channel using a channel selection filter 152. Processing circuitry 108 may also provide FM demodulation of the tuned digital signals using a FM demodulator 154 and stereo decoding, such as MPX decoding, using a stereo decoder 156. In addition, processing circuitry 108 tunes and decodes RDS/RBDS data using in part RDS/RBDS decoder 158 within processing circuitry 108. Processing circuitry 108 outputs left (L) and right (R) digital audio signals 122A. Integrated DACs 124 and 126 convert digital audio signals 122 to left (L) and right (R) analog audio signals 128.

Output circuitry 28B(1) and output circuitry 28B(2) generate the left and right digital audio output channels of signals 122B, respectively, from the left and right digital audio channels of signals 122A, respectively, as described above with reference to FIG. 3A. In other embodiments, receiver 100B includes other instances of output circuitry 28B for use in generating and provided other digital output signals.

FIG. 1C is a block diagram illustrating an embodiment 100C of low-IF receiver 100. Receiver 100C forms an integrated terrestrial broadcast that is configured to receive FM and AM broadcasts. Receiver 100C includes an FM antenna 111 that provides a differential FM input signal, FMI, between antenna 111 and a ground connection, RFGND, 113, to an LNA 102A. Receiver 100C also includes an AM antenna 115 that provides a differential AM input signal, AMI, between antenna 115 and ground connection, RFGND, 113, to an LNA 102B. AM antenna 115 is a ferrite bar antenna, and the AM reception can be tuned using an on-chip variable capacitor circuit 144. FM antenna 111 reception may also be tuned with an on-chip variable capacitor circuit (not shown), if desired. An integrated supply regulator (LDO) block 188 regulates the on-chip power using a supply voltage, VDD (2.7-5.5 V), from a power supply 192 across a capacitor 194. LDO block 188 includes voltage supply circuitry 52 and voltage supply circuitry 38.

LNAs 102A and 102B operate in conjunction with automatic gain control (AGC) blocks 162A and 162B, respectively, and provide output signals to mixers 104A and 104B, respectively. Mixers 104A and 104B process the respective signals and each generate real (I) and an imaginary (Q) signals. Mixers 104A and 104B each provide the real (I) and an imaginary (Q) signals to a programmable gain amplifier (PGA) 164. Receiver 100C operates such that only one of mixers 104A and 104B provides signals to PGA 164 at a time. PGA 164 processes the signals from mixers 104A and 104B to generate output signals. The output signals from PGA 164 are then converted to digital I and Q values with I-path ADC 146 and Q-path ADC 148.

Processing circuitry 108 then processes the digital I and Q values to produce left (L) and right (R) digital audio output signals and provides the digital audio output signals to digital audio block 194. Digital audio block 194 uses instances of output circuitry 28B to generate the digital audio output signals (DOUT) as described above with reference to FIG. 3A. Digital audio block 194 provides the digital audio output signals (DOUT) to controller 190 and communicates with controller 190 using a DFS signal. In addition, these left (L) and right (R) digital audio output signals are processed by DAC circuits 124 and 126 to produce left (LOUT) and right (ROUT) analog output signals. These analog output signals are output to listening devices, such as headphones or speakers. Amplifier 166 and speaker outputs 168A and 168B, for example, may represent headphones or speakers for listening to the analog audio output signals. As described above, processing circuitry 108 provides a variety of processing features, including digital filtering, FM and AM demodulation (DEMOD) and stereo/audio decoding, such as MPX decoding. Low-IF block 180 includes additional circuitry utilized to control the operation of processing circuitry 108 in processing the digital I/Q signals.

Receiver 100C also includes a digital control interface 186 to communicate with external devices, such as controller 190. The digital communication interface between control interface 186 and controller 190 includes a bi-directional GPO signal, a VIO signal, a bi-directional serial data input/output (SDIO) signal, a serial clock input (SCLK) signal, and a serial interface enable (SEN_) input signal. In addition, control and/or data information is provided through interface 186 to and from external devices, such as controller 192. For example, a RDS/RBDS block 182 reports relevant RDS/RBDS data from RDS/RBDS decoder 158 in processing circuitry 108 through control interface 186. A receive signal strength indicator block (RSSI) 184 analyzes the received signal and reports data concerning the strength of the signal through control interface 186. Control interface 186 may include one or more instances of output circuitry 28B to generate one or more of the digital output signals provided to controller 190. In other embodiments, other communication interfaces may be used, if desired, including serial or parallel interfaces that use synchronous or asynchronous communication protocols.

An external oscillator 176, operating, for example, at 32.768 kHz, provides a fixed reference clock signal to a tune block 174 through an RCLK connection. Tune block 174 also receives a DCLK signal 178. Tune block 174 generates a reference frequency and provides the reference frequency to a frequency synthesizer 172. An automatic frequency control (AFC) block 170 receives a tuning error signal from the receive path circuitry within receiver 100C and provide a correction control signal to frequency synthesizer 172.

Frequency synthesizer 172 receives the reference frequency from tuning block 174 and the correction control signal from AFC block 170. Frequency synthesizer 172 generates two mixing signals that are 90 degrees out of phase with each other and provides the mixing signals to mixers 104A and 104B as signals 118A and 118B, respectively.

In other embodiments, receivers 100A, 100B, and 100C may be combined with transmitter circuitry to form transceivers 100A, 100B, and 100C.

Figure 4:
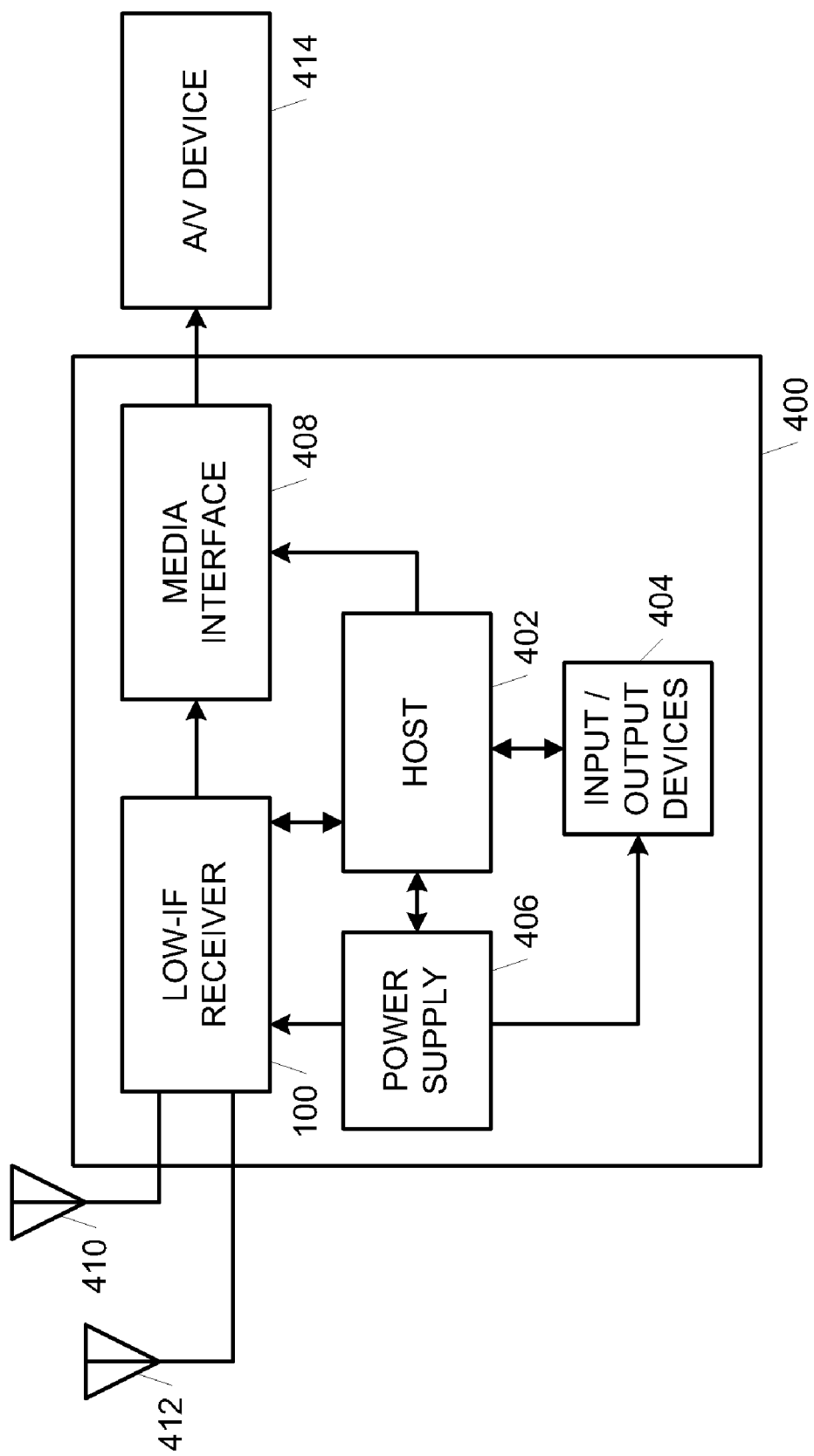
FIG. 4 is a block diagram illustrating one embodiment of a device that includes a low-IF receiver.

FIG. 4 is a block diagram illustrating one embodiment of a device 400 that includes low-IF receiver 100. Device 400 may be any type of portable or non-portable electronic device such as a mobile or cellular telephone, a personal digital assistant (PDA), an audio and/or video player (e.g., an MP3 or DVD player), an audio and/or video system (e.g., a television or stereo system), a wireless telephone, a desktop or laptop computer, or a peripheral card (e.g., a USB card) that couples to a computer. Device 400 includes low-IF receiver 100, a host 402, one or more input/output devices 404, a power supply 406, a media interface 408, an FM antenna 410, an AM antenna 412, and an audio/video (A/V) device 414, among other components.

Low-IF receiver 100 receives broadcast signals using antenna 410 and antenna 412, processes the signals as described above, provides digital audio signals to host 402, and provides analog audio signals to audio output interface 408. Low-IF receiver 100 selects a broadcast channel in response to channel selection inputs from host 402.

Host 402 provides channel selection inputs and other control inputs to low-IF receiver 100. Host 402 receives the digital audio signals from low-IF receiver 100, processes the digital audio signals, and provides the processed signals in a digital or audio format to media interface 408. Host 402 may provide control inputs to media interface 408 to select the audio signals that are output by media interface 408. Host 402 also receives RDS/RBDS data from receiver 100 and provides the RDS/RBDS data to input/output devices 404. Host 402 may also provide visual information to media interface 408 for display to a user.

Input/output devices 404 receive information from a user and provide the information to host 402. Input/output devices 404 also receive information from host 402 and provide the information to a user. The information may include RDS/RBDS data, channel selection information, voice and/or data communications, audio, video, image, or other graphical information. Input/output devices 404 include any number and types of input and/or output devices to allow a user provide information to and receive information from device 400. Examples of input and output devices include a microphone, a speaker, a keypad, a pointing or selecting device, and a display device.

Power supply 406 provides power to low-IF receiver 100, host 402, input/output devices 404, and media interface 408. Power supply 406 includes any suitable portable or nonportable power supply such as a battery or an AC plug.

Media interface 408 provides at least one digital or analog audio signal stream to A/V device 414. A/V device 414 broadcasts the audio signal to a user. A/V device 414 may be any suitable audio broadcast device such as headphones or speakers. A/V device 414 may also include an amplifier or other audio signal processing devices. A/V device 414 may further include any suitable video device configured to display information from host.

In the above embodiments, processing circuitry 108 includes hardware, software, firmware, or a combination of these. In one embodiment, components of processing circuitry 108 may form a program product with instructions that are accessible to and executable by processing circuitry 108 to perform the functions of processing circuitry described above. The program product may be stored in any suitable storage media that is readable by processing circuitry 108. The storage media may be within or external to processing circuitry 108.

In the above embodiments, at least LO generation circuitry 130, mixer 104, low-IF conversion circuitry 106 and processing circuitry 108 may be located on-chip and integrated on the same integrated circuit (i.e., on a single chip that is formed on a common substrate). In addition, any of LNA 102, LNA 102A, and LNA 102B and other desired circuitry may also be integrated into the same integrated circuit. An antenna that couples to LNAs 102, 102A, or 102B (such as antennas 111 and 115 in FIG. 1C or antennas 410 and 412 in FIG. 4) may be located off-chip (i.e., external to the common substrate that includes receiver 100). In other embodiments, other components of receiver 100 may be located off-chip.

In the above embodiments, a variety of circuit and process technologies and materials may be used to implement the receivers described above. Examples of such technologies include metal oxide semiconductor (MOS), p-type MOS (PMOS), n-type MOS (NMOS), complementary MOS (CMOS), silicon-germanium (SiGe), gallium-arsenide (GaAs), silicon-on-insulator (SOI), bipolar junction transistors (BJTs), and a combination of BJTs and CMOS (BiCMOS).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An output system having reduced spurious content, comprising:
    clock circuitry configured to generate a clock signal;
    signal generation circuitry configured to receive the clock signal and to generate a digital signal based upon the clock signal, the digital signal having spurious frequency content;
    output circuitry configured to receive the digital signal from the signal generation circuitry, to receive the clock signal, and to generate a digital output signal based upon the clock signal;
    first voltage supply circuitry coupled to provide a first supply voltage to the signal generation circuitry, the first supply voltage having spurious frequency content; and
    second voltage supply circuitry coupled to provide a second supply voltage to the output circuitry;
    wherein the second supply voltage from the second voltage supply circuitry has reduced spurious content as compared to the first supply voltage from the first voltage supply circuitry; and
    wherein the digital output signal from the output circuitry has reduced spurious content as compared to the digital signal from the signal generation circuitry.

2. The output system of claim 1, wherein the output circuitry comprises flip-flop circuitry configured to receive the clock signal as a clock input signal, to receive the digital signal as a data input signal, and to provide a data output signal that is synchronized with the clock input signal and that is based upon the data input signal, the digital output signal from the output circuitry being based upon the data output signal.

3. The output system of claim 2, wherein the flip-flop circuitry comprises DQ flip-flop circuitry.

4. The output system of claim 3, wherein the DQ flip-flop circuitry has a D input configured to receive the digital signal from the signal generation circuitry, and a Q output configured to output the digital output signal.

5. The output system of claim 2, wherein the output circuitry further comprises output inverter circuitry configured to receive the data output signal and to provide an inverted data output signal, the digital output signal from the output circuitry being based upon the inverted data output signal.

6. The output system of claim 5, wherein the output inverter circuitry is configured to receive the second supply voltage from the second voltage supply circuitry.

7. The output system of claim 2, wherein the output circuitry further comprises clock inverter circuitry configured to receive the clock signal and to provide an inverted clock signal as the clock input signal to the flip-flop circuitry.

8. The output system of claim 7, wherein the clock inverter circuitry is configured to receive the second supply voltage from the second voltage supply circuitry.

9. The output system of claim 1, wherein the signal generation circuitry includes a digital signal processor.

10. The output system of claim 9, wherein the digital signal from the signal generation circuitry is a digital audio signal.

11. The output system of claim 9, further comprising: radio-frequency (RF) circuitry configured to receive an analog RF signal, convert the analog RF signal to a digital RF signal, and provide the digital RF signal to the digital signal processor; wherein the digital signal processor is configured to generate the digital signal from the signal generation circuitry from the digital RF signal.

12. The output system of claim 1, wherein the digital signal processor is configured to generate the digital signal from the signal generation circuitry at a rate of 32,000 frames per second, and wherein the spurious frequency content occurs at approximately 32 kHz.

13. The output system of claim 1, wherein the second voltage supply circuitry is electrically isolated from the first voltage supply circuitry so that the second voltage supply includes substantially no spurious frequency content.

14. The output system of claim 1, where the digital signal from the signal generation circuitry comprises at least one of Radio Data System (RDS) signals, Radio Broadcast Data System (RBDS) signals, or a combination thereof.

15. A method of generating a digital output signal having reduced spurious content, comprising:
  providing signal generation circuitry coupled to output circuitry;
  receiving a clock signal in the signal generation circuitry;
  generating a first digital signal in the signal generation circuitry based upon the clock signal, the first digital signal having spurious frequency content;
  receiving the clock signal and the generated first digital signal in the output circuitry;
  generating a digital output signal in the output circuitry based upon the clock signal;
  providing a first supply voltage to the signal generation circuitry, the first supply voltage having spurious frequency content; and
  providing a second supply voltage to the output circuitry;
  wherein the second supply voltage has reduced spurious content as compared to the first supply voltage; and
  wherein the digital output signal generated in the output circuitry has reduced spurious content as compared to the first digital signal generated in the signal generation circuitry.

16. The method of claim 15, wherein the output circuitry comprises flip-flop circuitry; and wherein the method further comprises:
  receiving the clock signal in the flip-flop circuitry as a clock input signal;
  receiving the first digital signal in the flip-flop circuitry as a data input signal; and
  providing a data output signal from the flip-flop circuitry that is synchronized with the clock input signal and that is based upon the data input signal, the digital output signal from the output circuitry being based upon the data output signal.

17. The method of claim 15, wherein the flip-flop circuitry comprises DQ flip-flop circuitry.

18. The method of claim 17, further comprising receiving the first digital signal at a D input of the DQ flip-flop circuitry; and outputting the digital output signal at a Q output of the DQ flip-flop circuitry.

19. The method of claim 15, wherein the output circuitry further comprises output inverter circuitry; and where the method further comprises receiving the data output signal in the output inverter circuitry and providing inverted data output signal from the output inverter circuitry, the digital output signal from the output circuitry being based upon the inverted data output signal.

20. The method of claim 19, further comprising receiving the second supply voltage in the output inverter circuitry.

21. The method of claim 15, wherein the output circuitry further comprises clock inverter circuitry; and where the method further comprises receiving the clock signal in the clock inverter circuitry, and providing an inverted clock signal as the clock input signal to the flip-flop circuitry.

22. The method of claim 21, further comprising receiving the second supply voltage in the clock inverter circuitry.

23. The method of claim 15, further comprising:
  generating the first digital signal in the signal generation circuitry using the first clock signal received in the signal generation circuitry;
  generating the digital output signal in the output circuitry using a second clock signal that is synchronized with the first clock signal received in the output circuitry; and
  generating the second clock signal from the first clock signal using the second voltage supply.

24. The method of claim 15, wherein the first digital signal is a digital audio signal.

25. The method of claim 24, further comprising:
  providing radio-frequency (RF) circuitry;
  providing a digital signal processor;
  receiving an analog RF signal in the RF circuitry;
  using the RF circuitry to convert the analog RF signal to a digital RF signal;
  providing the digital RF signal to the digital signal processor; and
  using the digital signal processor to generate the first digital signal from the signal generation circuitry from the digital RF signal.

26. The method of claim 25, further comprising using the digital signal processor to generate the first digital signal from the signal generation circuitry at a rate of 32,000 frames per second, and wherein the spurious frequency content occurs at approximately 32 kHz.

27. The method of claim 15, wherein the first supply voltage is electrically isolated from the second supply voltage so that the second supply voltage includes substantially no spurious frequency content.

28. The method of claim 15, where the first digital signal comprises at least one of Radio Data System (RDS) signals, Radio Broadcast Data System (RBDS) signals, or a combination thereof.

* * * * *